(12) United States Patent
Marcelli et al.

(10) Patent No.: US 11,153,798 B2
(45) Date of Patent: Oct. 19, 2021

(54) MANAGEMENT OF A MOBILE DEVICE IN PROXIMITY OF A HOME GATEWAY WITH MOBILE CONNECTIVITY TO A WIDE AREA NETWORK

(71) Applicant: Telecom Italia S.p.A., Milan (IT)

(72) Inventors: Maurizio Marcelli, Rome (IT); Fabio Ricciato, Turin (IT)

(*) Notice: Subject to any disclaimer, the term of this patent is extended or adjusted under 35 U.S.C. 154(b) by 0 days.

(21) Appl. No.: 16/762,755

(22) PCT Filed: Nov. 8, 2018

(86) PCT No.: PCT/EP2018/080660
§ 371 (c)(1),
(2) Date: May 8, 2020

(87) PCT Pub. No.: WO2019/092130
PCT Pub. Date: May 16, 2019

(65) Prior Publication Data
US 2021/0185575 A1 Jun. 17, 2021

(30) Foreign Application Priority Data
Nov. 9, 2017 (IT) .................. 102017000127703

(51) Int. Cl.
*H04W 88/16* (2009.01)
*H04W 36/14* (2009.01)
(Continued)

(52) U.S. Cl.
CPC .......... *H04W 36/14* (2013.01); *H04W 12/72* (2021.01); *H04W 36/26* (2013.01); *H04W 48/18* (2013.01);
(Continued)

(58) Field of Classification Search
None
See application file for complete search history.

(56) References Cited

U.S. PATENT DOCUMENTS

| | | | | |
|---|---|---|---|---|
| 2005/0271020 A1* | 12/2005 | Thermond | .......... | H04M 7/0066 370/338 |
| 2009/0097476 A1* | 4/2009 | Roux | .................... | H04W 88/16 370/352 |

(Continued)

FOREIGN PATENT DOCUMENTS

| | | |
|---|---|---|
| EP | 2890180 A1 | 7/2015 |
| WO | 2013/000645 A1 | 1/2013 |

(Continued)

OTHER PUBLICATIONS

Feb. 4, 2019—(WO) ISR and Written Opinion—App PCT/EP2018/080660.

*Primary Examiner* — German Viana Di Prisco
(74) *Attorney, Agent, or Firm* — Banner & Witcoff, Ltd.

(57) ABSTRACT

A method and system for managing a mobile device entering a wireless coverage area of a home gateway connected to a WAN through a mobile communication network is provided. As the mobile device connects to the home gateway via its wireless interface, the home gateway requests an onloading token for the mobile device from a management server cooperating with the mobile communication network. The management server releases the onloading token and sends it to the home gateway, which forwards it to the mobile device. The mobile device receives the onloading token from the home gateway, and in reply thereto, disconnects from the home gateway and starts exchanging mobile data traffic with the WAN through the mobile communication network via its mobile interface.

15 Claims, 3 Drawing Sheets

(51) Int. Cl.
    *H04W 48/18*    (2009.01)
    *H04W 36/26*    (2009.01)
    *H04W 12/72*    (2021.01)
    *H04W 76/34*    (2018.01)
    *H04W 84/12*    (2009.01)
    *H04W 84/04*    (2009.01)

(52) U.S. Cl.
    CPC ........... H04W 76/34 (2018.02); H04W 88/16 (2013.01); *H04W 84/045* (2013.01); *H04W 84/12* (2013.01)

(56) References Cited

U.S. PATENT DOCUMENTS

| | | | |
|---|---|---|---|
| 2013/0322238 A1 | 12/2013 | Sirotkin | |
| 2013/0329714 A1* | 12/2013 | Fan | H04W 48/00 370/338 |
| 2014/0192642 A1* | 7/2014 | Medapalli | H04W 48/18 370/230 |
| 2015/0163811 A1* | 6/2015 | Konstantinou | H04W 76/16 370/329 |
| 2017/0055195 A1* | 2/2017 | Ingale | H04W 76/10 |
| 2020/0022217 A1* | 1/2020 | Ringland | H04W 72/082 |

FOREIGN PATENT DOCUMENTS

| | | |
|---|---|---|
| WO | 2015/124967 A1 | 8/2015 |
| WO | 2016/049562 A2 | 3/2016 |

* cited by examiner

MANAGEMENT OF A MOBILE DEVICE IN PROXIMITY OF A HOME GATEWAY WITH MOBILE CONNECTIVITY TO A WIDE AREA NETWORK

TECHNICAL FIELD

The present invention relates to the field of communication networks. In particular, the present invention relates to a method and system for managing a mobile device in proximity of a home gateway with mobile connectivity to a wide area network (WAN).

BACKGROUND ART

As known, a home gateway is a device located at a user's premises which allows the user to access—by means of user's devices (e.g. smartphones, computers, tablets, smart TVs, etc.)—fixed broadband services, namely broadband services which may be accessed only at a predefined fixed location (typically, the user's home).

On the user side, a home gateway provides wired (e.g. Ethernet) connectivity and/or wireless (e.g. Wi-Fi) connectivity to user's devices provided with suitable wireless interfaces. On the network side, the home gateway is typically connected to a wide area network (WAN) by means of a broadband connection.

The broadband connection of a home gateway may be a wired connection, e.g. an optical fibre connection or an ADSL (Asymmetric Digital Subscriber Line) connection. Home gateways are also known, whose broadband connection to the WAN is a mobile connection. This mobile connection is typically implemented through a mobile communication network capable of supporting broadband transmission of mobile data traffic (e.g. HSPA, LTE, WiMAX, etc.). The home gateway comprises a mobile interface capable of connecting to the mobile communication network, which is in its turn connected to the WAN. Such home gateways are typically used to provide users with fixed broadband services in areas where wired broadband connections to WANs are not available (e.g. low density population areas, rural areas, etc.), as well as to allow users to use a same home gateway in different locations.

Portable mobile devices (namely, portable devices provided with mobile interfaces capable of connecting to a mobile communication network, such as smartphones) may be configured to automatically perform a so-called "mobile data offloading" procedure. According to such known procedure, as a mobile device enters the wireless coverage area of a home gateway, the mobile device establishes a wireless connection with the home gateway by its wireless interface (typically, its Wi-Fi interface) and starts using it for exchanging mobile data traffic with the WAN (mobile voice traffic continues being in charge to the mobile interface of the mobile device). The mobile data traffic pertaining to the mobile device is then moved from the mobile interface of the mobile device to the wireless interface of the mobile device and its wireless connection to the home gateway.

EP 2 890 180 describes a method for managing a network access user policy (UOP) associated to a user equipment (UE) for offloading data traffic using an ANDSF (Access Network Discovery and Selection Function). The UE sends to a server through the mobile communication network the identifier of an available Wi-Fi access point. The server replies by requesting a trial offloading of the UE through the Wi-Fi access point. If the trial is successful, the UE sends to the server via the Wi-Fi access point parameters for selecting a UOP. The server sets an UOP accordingly and sends it to the UE, which may then edit the UOP, apply the UOP, distribute the UOP or delete the UOP.

SUMMARY OF THE INVENTION

The Applicant has noticed that, while the above mobile data offloading procedure provides several advantages when a home gateway is connected to a WAN via a wired connection (e.g. releasing bandwidth on the cellular bands of the mobile communication network), the same procedure may give rise to some drawbacks when the home gateway is connected to a WAN via a mobile connection.

First of all, even if the mobile device wirelessly connects to the home gateway, the mobile data traffic pertaining to the mobile device actually is still loaded on the mobile communication network via the home gateway. Hence, no bandwidth on the cellular bands is released.

Moreover, the mobile device disadvantageously takes away part of the home gateway transmission resources from other user devices which—differently from the mobile device—might have no mobile interface and therefore forcedly have to pass through the home gateway in order to communicate with the WAN through the mobile communication network.

Further, transmission of mobile data traffic pertaining to the mobile device via the home gateway typically entails the need to add some routing overhead, which disadvantageously may decrease the transmission efficiency of such traffic.

Further, nowadays home gateways with mobile connections to WAN are typically equipped with mobile technologies that often are less advanced that mobile devices. Hence, the user may disadvantageously experience a deterioration of the quality of service as her/his mobile device performs the mobile data offloading procedure and gets connected to the home gateway.

In view of the above, the Applicant has tackled the problem of providing a method and system for managing a mobile device in proximity of a home gateway with mobile connectivity to a WAN which overcomes the aforesaid drawbacks.

In particular, the Applicant has tackled the problem of providing a method and system for managing a mobile device in proximity of a home gateway with mobile connectivity to a WAN, which provide a more efficient management of the transmission resources of the home gateway and which preserve transmission efficiency and quality of service of mobile data traffic pertaining to the mobile device.

According to embodiments of the present invention, these problems are solved by a method and system for managing a mobile device entering a wireless coverage area of a home gateway connected to a WAN through a mobile communication network wherein, as the mobile device connects to the home gateway via its wireless interface, the home gateway requests an onloading token for the mobile device to a management server cooperating with the mobile communication network. Upon reception of the onloading token, the mobile device disconnects from the home gateway and starts exchanging mobile data traffic with the WAN through the mobile communication network using its mobile interface.

Therefore, according to the present invention, the mobile device is operated to perform a "mobile data onloading procedure", namely it is operated so that, even if it is within the coverage area of the home gateway, it continues using its mobile interface for exchanging mobile data traffic with the WAN through the mobile communication network—as it usually does when it is not within the wireless coverage area of any home gateway. This entails several advantages.

First of all, the mobile device does not take away transmission resource of the home gateway to other user devices (e.g. tablet, smart-TV, etc.) which—differently from the mobile device—might have no mobile interface and therefore forcedly have to pass through the home gateway in order to communicate with the WAN through the mobile communication network. The transmission resources of the home gateway are therefore managed in a more efficient way.

Further, the mobile data traffic pertaining to the mobile device continues being transmitted without the need to add any routing overhead, which would decrease its transmission efficiency.

Further, since the mobile device basically continues exchanging its mobile data traffic via its mobile interface directly connected to the mobile communication network, the user does not experience any deterioration of the quality of service which might be due e.g. to the fact that the home gateway is equipped with a mobile technology whose performance is worse than that of the mobile device.

According to a first aspect, the present invention provides a method for managing a mobile device entering a wireless coverage area of a home gateway connected to a wide area network through a mobile communication network, the method comprising:

a) as the mobile device connects to the home gateway via a wireless interface of the mobile device, by the home gateway requesting an onloading token for the mobile device to a management server cooperating with the mobile communication network; and
b) at the mobile device, receiving the onloading token from the home gateway and, in reply thereto, disconnecting from the home gateway and starting exchanging mobile data traffic with the wide area network through the mobile communication network using a mobile interface of the mobile device.

Preferably, at step a) the home gateway requests the onloading token to the management server by using a mobile connection of the home gateway with the mobile communication network and receives the onloading token from the management server by using the mobile connection with the mobile communication network.

Preferably, the onloading token comprises a random number generated by the management sever.

Preferably, step a) further comprises storing in a token database one or more parameters for determining a tariff to be charged to the mobile device for the exchange of mobile data traffic via the mobile interface following the disconnecting from the home gateway.

Preferably, these one or more parameters comprise at least one of:
  a mobile tariff $T_M$ applied to mobile data traffic exchanged by the mobile device with the wide area network via the mobile interface;
  a fixed tariff $T_F$ applied to data traffic exchanged by the home gateway with the wide area network through the mobile communication network; and
  a time $t_R$ at which the onloading token has been released.

Optionally, step a) comprises inserting at least part of the one or more parameters in the onloading token.

Preferably, step b) comprises forwarding the onloading token to the management server through the mobile interface and:

c) at the management server, determining a tariff to be charged to the mobile device for the exchange of mobile data traffic via the mobile interface following the disconnecting from the home gateway.

Preferably, the tariff to be charged to the mobile device is based on the one or more parameters stored in the token database.

Preferably, determining the tariff to be charged to the mobile device comprises checking whether the fixed tariff $T_F$ is lower than the mobile tariff $T_M$ and, in the affirmative, applying the fixed tariff $T_F$ to mobile data traffic exchanged by the mobile device via the mobile interface following the disconnecting from the home gateway.

Preferably, the fixed tariff $T_F$ is applied for a period T starting from the time $t_R$ at which the onloading token has been released.

Preferably, the method further comprises, during the period T, periodically checking by the management server whether the mobile device is staying near the home gateway and stopping applying the fixed tariff $T_F$ if it is determined that the mobile device is no more near the home gateway.

Preferably, the method further comprises, after the period T is expired, at the mobile device connecting again to the home gateway via the wireless interface, receiving another onloading token from the home gateway and, in reply thereto, disconnecting again from the home gateway and starting again exchanging mobile data traffic with the wide area network through the mobile communication network using a mobile interface of the mobile device.

Preferably, at step a) the home gateway requests the onloading token if it is determined that the mobile device is equipped with a SIM card issued by the same mobile network operator that issued the home gateway.

Optionally, at step a) the home gateway checks whether the mobile device is equipped with a mobile technology whose performance is at least comparable to that of the home gateway and requests the onloading token if the check provides a positive outcome.

According to a second aspect, the present invention provides a system for managing a mobile device entering a wireless coverage area of a home gateway connected to a wide area network through a mobile communication network, the system comprising:
  a management server cooperating with the mobile communication network and configured to, as the mobile device connects to the home gateway via a wireless interface of the mobile device, receive from the home gateway a request for an onloading token for the mobile device and, in reply thereto, provide the onloading token to the home gateway; and
  a client application suitable for being executed by the mobile device and configured to receive the onloading token from the home gateway and, in reply thereto, operating the mobile device to disconnect from the home gateway and start exchanging mobile data traffic with the wide area network through the mobile communication network using a mobile interface of the mobile device.

BRIEF DESCRIPTION OF THE DRAWINGS

The present invention will become clearer from the following detailed description, given by way of example and not of limitation, to be read with reference to the accompanying drawings, wherein.

DETAILED DESCRIPTION OF PREFERRED EMBODIMENTS OF THE INVENTION

Figure 1:
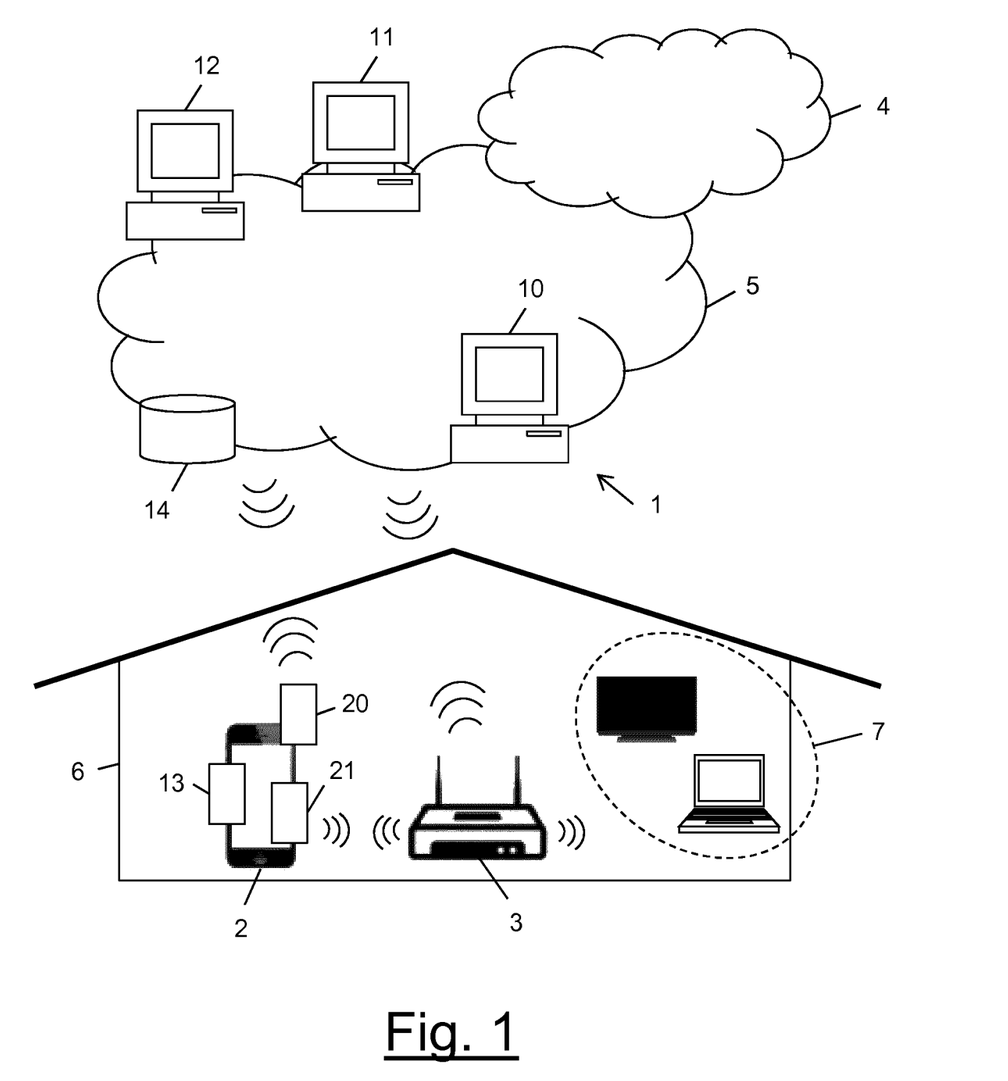
FIG. 1 schematically shows a system for managing a mobile device according to an embodiment of the present invention.

FIG. 1 schematically shows a system 1 for managing a mobile device 2 entering the wireless coverage area of a home gateway 3 connected to a WAN 4 through a mobile communication network 5, according to an embodiment of the present invention.

The mobile device 2 is preferably provided with a mobile interface 20 enabling autonomous connection of the mobile device 2 to the mobile communication network 5. Also the home gateway 3 preferably comprises a mobile interface (not shown in FIG. 1) enabling autonomous connection of the home gateway 3 to the mobile communication network 5.

The mobile device 2 also preferably comprises a wireless interface 21 suitable for connecting the mobile device 2 to a corresponding wireless interface (not shown in FIG. 1) of the home gateway 3, when the mobile device 2 is brought within the wireless coverage area of the home gateway 3 (few tens of meters). Such wireless interfaces may be for instance Wi-Fi interfaces.

The mobile device 2 also preferably comprises a SIM card (not shown in the drawings) associated with the user of the mobile device 2. The mobile device 2 may be for instance the user's smartphone.

The home gateway 3 is located at a certain location 6 (e.g. the premises of the home gateway's owner). This way, the home gateway 3 may provide wireless connectivity to a plurality of user devices 7 (such as smartphones, smart-TVs, tablets, PCs, etc.)—including the mobile device 2—located within its wireless coverage area and connect them to the WAN 4 through the mobile communication network 5.

The mobile communication network 5 is preferably capable of supporting broadband transmission of data traffic. The mobile communication network 5 is therefore preferably implemented by a mobile technology such as, for instance, HSPA (High-Speed Packet Access), LTE FDD (Long Term Evolution Frequency Division Duplex), LTE TDD (Long Term Evolution Time Division Duplex) or WiMAX, or evolutions thereof.

The mobile communication network 5 is operated by a certain mobile network operator MNO, which issued the SIM card of the mobile device 2 and, preferably, the home gateway 3. The mobile network operator MNO therefore provides:
  mobile data and voice communication services to the mobile device 2 at a certain mobile tariff $T_M$; and
  fixed data communication services through the home gateway 3 at a certain fixed tariff $T_F$. The cost per data unit (e.g. MB) of the fixed tariff $T_F$ is typically lower than that of the mobile tariff $T_M$.

According to embodiments of the present invention, the management system 1 preferably comprises a management server 10 cooperating with the mobile communication network 5. The management server 10 may be implemented within the infrastructure of the mobile communication network 5.

The management system 1 also preferably comprises a mobile authentication server 11 cooperating with the mobile communication network 5. Also the mobile authentication server 11 may be implemented within the infrastructure of the mobile communication network 5.

The management system 1 also preferably comprises a tariff control server 12 cooperating with the mobile communication network 5. Also the tariff control server 12 may be implemented within the infrastructure of the mobile communication network 5.

Preferably, the management system 1 also comprises a client application 13 suitable for being installed on and executed by the mobile device 2. The client application 13 may be e.g. an app downloadable by the mobile device 2 from an app online store (iTunes Store™, Google Play™, etc.). Alternatively, the client application 13 may be a browser of the mobile device 2, provided with a suitable script (e.g. a Javascript™).

The system management 1 also preferably comprises one or more databases. In particular, the management system 1 preferably comprises a token database 14, whose role will be described in detail herein after.

Figure 2:
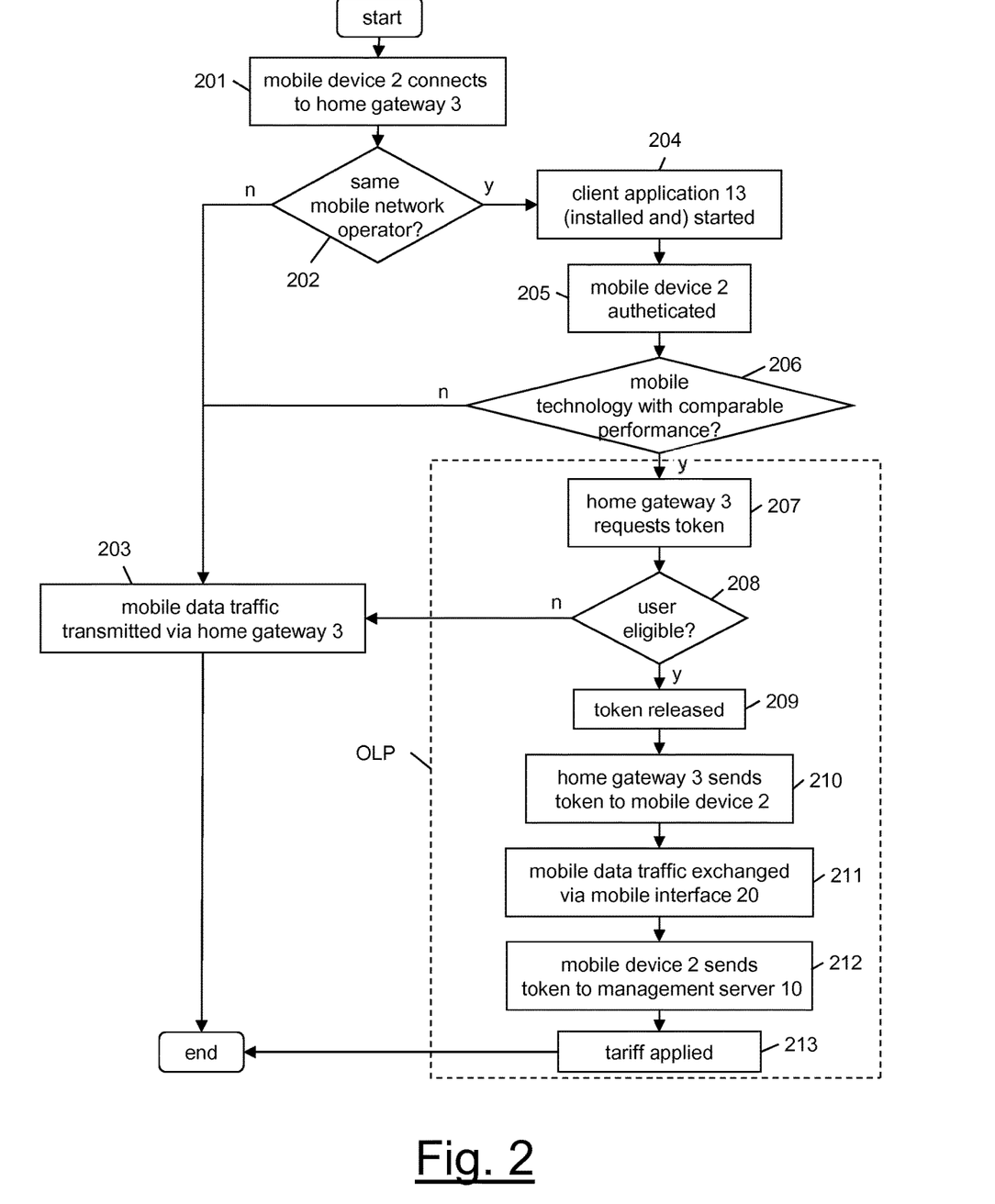
FIG. 2 is a flow chart of the operation of the system shown in FIG. 1.

The operation of the system 1 and its components will be now described in detail, with reference to the flow chart of FIG. 2.

As the user of the mobile device 2 (which may be either the owner of the home gateway 3 or another user, e.g. come to visit the owner of the home gateway 3 at her/his premises 6) enters the wireless coverage area of the home gateway 3, the mobile device 2 automatically connects to the home gateway 3 by means of its wireless interface 21 (step 201). Step 201 preferably comprises the determination of the SSID (Service Set Identifier) of the home gateway 3 by the wireless interface 21 of the mobile device 2. The client application 13 may be configured to automatically look for the specific SSID of the home gateway 3, in order to determine whether it has entered the wireless coverage area of the home gateway 3.

The home gateway 3 then preferably determines whether the mobile device 2 is equipped with a SIM card of its own mobile network operator, namely MNO (step 202).

According to a first variant, the client application 13 automatically performs step 202 by automatically detecting whether the mobile device 2 is equipped with a SIM card with active subscription to the mobile network operator MNO and by automatically retrieving its telephone number (MSISDN).

According to another variant, for the purpose of performing step 202 the home gateway 3 preferably instructs the mobile device 2 to automatically open its browser, e.g. by using the known Universal Access Method (UAM), on a dedicated web page of the mobile network operator MNO, wherein the user is requested to indicate whether her/his mobile device 2 is equipped with a SIM card of the mobile network operator MNO.

Figure 3:
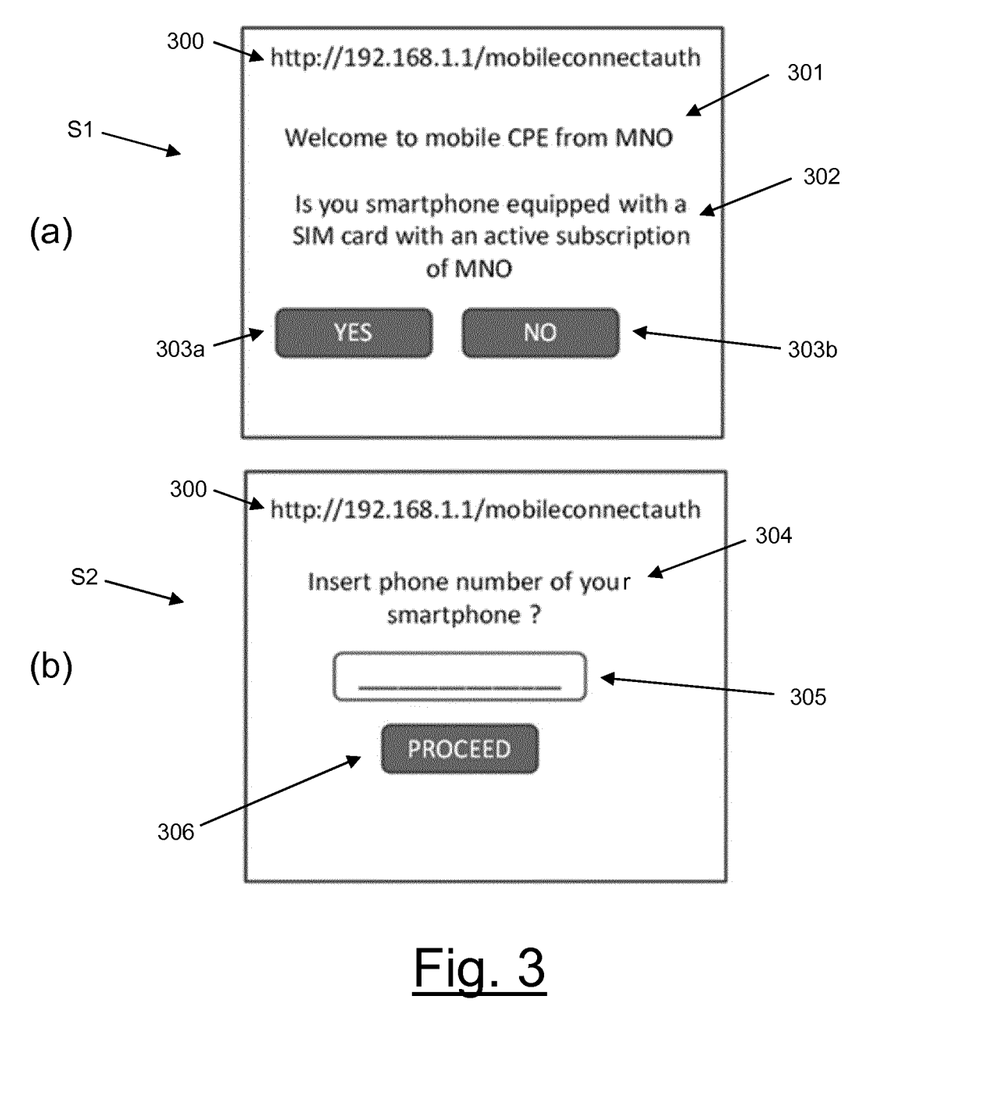
FIG. 3 shows two exemplary screens of a web page displayed by the mobile device 2 during one of the steps of the flow chart in FIG. 2.

An exemplary first screen S1 of this web page is schematically depicted in FIG. 3(a). The first screen S1 may show the URL 300 of the web page, a welcome message 301 and a request 302 for the user to indicate whether her/his mobile device 2 is equipped with a SIM card with active subscription to the mobile network operator MNO. In order to enable the user replying to the request, the first screen S1 may provide two pushbuttons "YES" (indicated as 303a in FIG. 3(a)) and "NO" (indicated as 303b in FIG. 3(b)) which the user may select. If the user selects the pushbutton "YES", the web page may show a second screen S2, which is schematically depicted in FIG. 3(b). Such second screen S2 may show again the URL 300 of the web page, a request 304 for the user to insert her/his telephone number (MSISDN), a text entry field 305 allowing the user to enter its telephone number and a confirmation pushbutton 306.

If at step 202 it is determined that the mobile device 2 is equipped with a SIM card of a mobile network operator other than MNO, the home gateway 3 does not perform any other step and the mobile device 2 starts using the wireless connection to the home gateway 3 for exchanging mobile data traffic with the WAN 4 through the mobile communication network 5 (step 203).

If, instead, at step 202 it is determined that the mobile device 2 is equipped with a SIM card having an active subscription to the mobile network operator MNO, the home gateway 3 preferably starts execution of the client application 13 at the mobile device 2 (step 204). If the mobile device 2 has not installed the client application 13 yet, step 204 comprises the home gateway 3 preliminarily inviting the user of the mobile device 2 to install the client application 13, or having it automatically installed.

Then, the home gateway 3 preferably authenticates the mobile device 2 (step 205). For the purpose of performing the authentication step, different known protocols may be used such as OpenID Connect, oAuth or Mobile Connect. In any case, at step 205 the home gateway 3 preferably cooperates with the mobile authentication server 11.

For instance, at step 205 the mobile authentication server 11 may send an OTP (One Time Password) to the mobile device 2 and ask the user to input the received OTP, e.g. on a further screen of the above described dedicated web page of the mobile network operator MNO. Alternatively, the OTP may be automatically acquired by the client application 13. Once the client application 13 has acquired the OTP (either as manual input by the user or as automatically acquired), the client application 13 sends it to the authentication server 11, which then informs the home gateway 3 of the successful authentication.

Alternatively, the SIM card of the mobile device 2 may be provided with an applet. In this case, the mobile authentication server 11 may send a challenge to the applet which, upon reception of the challenge, asks the user to insert a PIN or prompt, and encrypts the challenge with a symmetric key or an asymmetric key previously shared with the mobile authentication server 11.

After the authentication step 205 is completed, the home gateway 3 can therefore conclude for certain that the mobile device 2 is equipped with a SIM card of the mobile network operator MNO.

Then, optionally, the home gateway 3 checks whether the mobile device 2 is equipped with a mobile technology whose performance (in terms of bandwidth and/or latency) is at least comparable to that of the home gateway 3 (step 206). Step 206 may be carried out by performing a bandwidth measurement at the mobile interface 20 of the mobile device 2. Alternatively, the home gateway 3 may request to the mobile device 2 the mobile technology it uses.

If the outcome of the check at step 206 is negative (namely, if the performance of the mobile technology at the mobile device 2 is worse than that of the home gateway 3), the home gateway 3 does not perform any other step and the mobile device 2 starts using the wireless connection to the home gateway 3 for exchanging mobile data traffic with the WAN 4 through the mobile communication network 5 (step 203 described above).

If, instead, the outcome of check 206 is positive (or if step 206—which is optional—is omitted), the management system 1 preferably starts a mobile data onloading procedure OLP.

In order to start such procedure OLP, the home gateway 3 preferably requests to the management server 10 an onloading token for the mobile device 2 (step 207). For the purpose of sending such request, the home gateway 3 preferably uses its mobile connection to the mobile communication network 5.

The management server 10 then preferably checks whether the mobile device 2 and the home gateway 3 are eligible for the onloading procedure (step 208). At step 208 the management server 10 may check, for instance, if the tariff plan of the mobile device 2 provides for an onloading procedure, if the mobile device 2 has a remaining credit, etc.

In the negative, the management server 10 preferably instructs the home gateway 3 not to perform any other step and the mobile device 2 starts using the wireless connection to the home gateway 3 for exchanging mobile data traffic with the WAN 4 through the mobile communication network 5 (step 203 described above).

In the affirmative, the management server 10 preferably releases an onloading token for the mobile device 2 and sends it to the home gateway 3 via its mobile connection to the mobile communication network 5 (step 209). Preferably, the onloading token may be for instance a random number generated by the management server 10. Alternatively, the onloading token may be a JSON (JavaScript Object Notation) Web Token. In any case, at step 209 the management server 10 preferably stores in the token database 14 information for identifying the released onloading token and one or more parameters needed to determine the tariff to be applied to the mobile device 2 as the onloading procedure is completed. Such one or more parameter preferably comprise:

- the mobile tariff $T_M$ applied by the mobile network operator MNO to mobile data traffic exchanged by the mobile device 2 with the WAN 4 through the mobile communication network 5 via the mobile interface 20;
- the fixed tariff $T_F$ applied by the mobile network operator MNO to the data traffic exchanged by the home gateway 3 with the WAN 4 through the mobile communication network 5; and
- the time $t_R$ at which the onloading token has been released.

At least part of such parameters may be optionally inserted in the onloading token, before it is sent to the home gateway 3.

The home gateway 3 then preferably forwards the onloading token to the mobile device 2 (step 210), in particular to the wireless interface 21 of the mobile device 2. Sending the onloading token from the management server 10 to the mobile device 2 through the home gateway 3 and the wireless interface 21 of the mobile device 2 (instead of sending it directly to the mobile interface 20 of the mobile device 2) is advantageous, in that it does not require any modification of the firmware of the mobile device 2.

Upon reception of the onloading token, the client application 13 preferably instructs the mobile device 2 to disconnect from the home gateway 3 and to start again using its mobile interface 20 for exchanging mobile data traffic with the WAN 4 through the mobile communication network 5 (step 211). Alternatively, upon reception of the onloading token, the client application 13 may request the user (e.g. via a text message shown on the display of the mobile device 2) to disconnect from the home gateway 3 by manually switching off the wireless interface 21 of the mobile device 2.

Therefore, according to the present invention, the mobile device 2 is operated so that, even if it is within the coverage area of the home gateway 3, it continues using its mobile interface 20 for exchanging mobile data traffic with the WAN 4 through the mobile communication network 5—as it usually does when it is not within the wireless coverage area of any home gateway. This entails several advantages.

First of all, the mobile device 2 does not take away transmission resource of the home gateway 3 to other user devices 7 (e.g. tablet, smart-TV, etc.) which—differently from the mobile device 2—might have no mobile interface and therefore forcedly have to pass through the home gateway 3 in order to communicate with the WAN 4 through the mobile communication network 5. The transmission resources of the home gateway 3 are therefore managed in a more efficient way.

Further, the mobile data traffic pertaining to the mobile device 2 continues being transmitted without the need to add any routing overhead, which would decrease its transmission efficiency.

Further, since the mobile device 2 basically continues exchanging its mobile data traffic via its mobile interface 20 directly connected to the mobile communication network 5, the user does not experience any deterioration of the quality of service which might be due e.g. to the fact that the home gateway 3 might be equipped with a mobile technology (e.g. 2.5G or 3G) whose performance is worse than that of the mobile device 2 (e.g. 4G or 4.5G).

By referring again to the flow chart of FIG. 2, the client application 13 preferably sends the onloading token to the management server 10 through the mobile interface 20 of the mobile device 2 (step 212).

The management server 10 receives the onloading token and preferably cooperates with the tariff control server 12 to determine a tariff to be charged to the mobile device 2 for the exchange of mobile data traffic via the mobile interface 20 following to the disconnection from the home gateway 3 at step 211 (step 213).

In particular, at step 213 the tariff control server 12 preferably reads the parameters associated with the onloading token (from the token itself and/or from the token database 14) and determines the tariff to be charged based on the value of such parameters.

In particular, if the parameters associated with the onloading token are the mobile tariff $T_M$, the fixed tariff $T_F$ and the time $t_R$ at which the onloading token has been released, at step 213 the tariff control server 12 preferably checks whether the fixed tariff $T_F$ is lower than the mobile tariff $T_M$ (which is quite common) and, in the affirmative, it preferably applies the fixed tariff $T_F$ to mobile data traffic exchanged by the mobile device 2 through the mobile interface 20. The fixed tariff is preferably applied for a period T (e.g. 1 hour) starting from the time $t_R$ at which the onloading token has been released.

For example, if the mobile tariff $T_M$ provides for remittance of a flat fee and a ceiling on the amount of download data traffic of X GB, while the fixed tariff $T_F$ provides for remittance of a flat fee and a ceiling on the amount of download data traffic of Y GB, where Y is usually higher than X, for the whole period T the tariff control server 12 preferably deducts the mobile data traffic received by the mobile device 2 through its mobile interface 20 from the fixed ceiling of Y GB, and not from the mobile ceiling of X GB. This is convenient for the user of the mobile device 2, who therefore temporarily stops eroding the more reduced (and typically more costly) mobile ceiling of X GB.

The user of the mobile device 2 is therefore advantageously incentivized to allow the above described mobile data onloading procedure being carried out on her/his mobile device 2. Indeed, if the user allows the mobile data onloading procedure being carried out on her/his mobile device 2, she/he will continue exchanging mobile data traffic directly by the mobile interface 20 of her/his mobile device 2 while at the same time enjoying a reduced tariff, namely the fixed tariff $T_F$ instead of the mobile tariff $T_M$, for a certain time T.

Optionally, during the period T, the management server 10 may periodically check whether the mobile device 2 is staying near the home gateway 3.

For this purpose, the management server 10 may periodically request to the mobile device 2 its current position as detected by the mobile device 2 itself. To this purpose, the mobile device 2 may use any known localizing technique, e.g. identification of the mobile cell in which is it located or a triangulation technique allowing the mobile device 2 to determine its current geographic coordinates. The management server 10 then preferably compares the current position of the mobile device 2 with the current position of the home gateway 3 as detected by the home gateway 3 itself. While the two positions match, the management server 10 concludes that the mobile device 2 is staying near the home gateway 3. If, instead, the management server 10 determines a mismatch between the two positions which exceeds a certain threshold THR (e.g. 100 m) fora certain number of consecutive periodical checks, then it concludes that the mobile device 2 is no more near the home gateway 3.

Alternatively, for the purpose of determining whether the mobile device 2 is staying near the home gateway 3, the management server 10 may instruct the client application 13 to periodically monitor the presence of the home gateway 3 by looking for its SSID.

In any case, while the management server 10 determines that the mobile device 2 is staying near the home gateway 3, it preferably instructs the tariff control server 12 to continue applying the fixed tariff $T_F$. If, instead, the management server 10 determines that the mobile device 2 is no more near the home gateway 3, it preferably instructs the tariff control server 12 to start applying again the mobile tariff $T_M$.

Preferably, after the time T is expired, the client application 13 may instruct the mobile device 2 to connect again to the home gateway 3 via its wireless interface 21, thereby reverting to step 201 of the flow chart of FIG. 2. At this second iteration, however, steps 202-206 are preferably omitted.

As the home gateway 3 realizes that the mobile device 2 is connected again thereto, it directly performs the above described step 207 of requesting another onloading token to the management server 10. Then, steps 208-213 are preferably performed again, thereby allowing the user of the mobile device 2 to disconnect again from the home gateway 3 (which provides the above described advantages) and, at the same time, enjoying a reduced tariff, namely the fixed tariff $T_F$ instead of the mobile tariff $T_M$, for a another period T.

The flow chart of FIG. 2 may be repeated for several times, thereby allowing the mobile device 2 to receive from the management server 10 onloading tokens as long as it is located within the coverage area of the home gateway 3.

The invention claimed is:

1. A method for managing a mobile device entering a wireless coverage area of a home gateway connected to a wide area network through a mobile communication network, said method comprising:
   a) requesting, by said home gateway, as said mobile device connects to said home gateway via a wireless interface of said mobile device, an onloading token for said mobile device from a management server cooperating with said mobile communication network; and b) at said mobile device, receiving said onloading token from said home gateway and, in reply thereto, disconnecting from said home gateway and starting exchanging mobile data traffic with said wide area network through said mobile communication network via a mobile interface of said mobile device.

2. The method according to claim 1, wherein at step a) said home gateway requests said onloading token from said management server via a mobile connection of said home gateway with said mobile communication network and receives said onloading token from said management server by using said mobile connection with said mobile communication network.

3. The method according to claim 1, wherein said onloading token comprises a random number generated by said management server.

4. The method according to claim 1, wherein step a) further comprises storing, in a token database, one or more parameters for determining an amount to be charged to said mobile device for the exchange of mobile data traffic via said mobile interface following said disconnecting from said home gateway.

5. The method according to claim 4, wherein said one or more parameters comprise at least one of:
- a mobile amount applied to mobile data traffic exchanged by said mobile device with said wide area network via said mobile interface;
- a fixed amount applied to data traffic exchanged by said home gateway with said wide area network through said mobile communication network; or
- a time at which said onloading token has been released.

6. The method according to claim 4, wherein step a) comprises inserting at least part of said one or more parameters in said onloading token.

7. The method according to claim 4, wherein step b) comprises forwarding said onloading token to said management server via said mobile interface and:

c) at said management server, determining an amount to be charged to said mobile device for the exchange of mobile data traffic via said mobile interface following said disconnecting from said home gateway.

8. The method according to claim 7, wherein said determining said amount to be charged to said mobile device is based on said one or more parameters stored in said token database.

9. The method according to claim 5, wherein said determining said amount to be charged to said mobile device comprises checking whether said fixed amount is lower than said mobile amount and, in the affirmative, applying said fixed amount to mobile data traffic exchanged by said mobile device via said mobile interface following said disconnecting from said home gateway.

10. The method according to claim 9, wherein said fixed amount is applied for a period starting from said time at which said onloading token has been released.

11. The method according to claim 10, further comprising, during said period, periodically checking by said management server whether said mobile device is within a distance from said home gateway and stopping applying said fixed amount if it is determined that said mobile device is not within the distance from said home gateway.

12. The method according to claim 10, further comprising, after said period expires, at said mobile device connecting again to said home gateway via said wireless interface, receiving another onloading token from said home gateway and, in reply thereto, disconnecting again from said home gateway and starting again exchanging mobile data traffic with said wide area network through said mobile communication network via a mobile interface of said mobile device.

13. The method according to claim 1, wherein at step a) said home gateway requests said onloading token if it is determined that said mobile device is equipped with a SIM card issued by the same mobile network operator that issued said home gateway.

14. The method according to claim 1, wherein at step a) said home gateway checks whether said mobile device is equipped with a mobile technology whose performance is at least comparable to that of said home gateway and requests said onloading token if said check provides a positive outcome.

15. A system for managing a mobile device entering a wireless coverage area of a home gateway connected to a wide area network through a mobile communication network, said system comprising:
- a management server cooperating with said mobile communication network and configured to, as said mobile device connects to said home gateway via a wireless interface of said mobile device, receive from said home gateway a request for an onloading token for said mobile device and, in reply thereto, provide said onloading token to said home gateway; and
- a non-transitory computer-readable medium storing instructions that, when executed by a computing device, cause said mobile device to receive said onloading token from said home gateway and, in reply thereto, operate said mobile device to disconnect from said home gateway and start exchanging mobile data traffic with said wide area network through said mobile communication network via a mobile interface of said mobile device.

* * * * *